United States Patent
Song et al.

(10) Patent No.: US 11,079,507 B2
(45) Date of Patent: Aug. 3, 2021

(54) PASSIVE SEISMIC IMAGING

(71) Applicant: BP Exploration Operating Company Limited, Middlesex (GB)

(72) Inventors: Zhongmin Song, Surrey (GB); York Zheng, Surbiton (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 118 days.

(21) Appl. No.: 16/671,300

(22) Filed: Nov. 1, 2019

(65) Prior Publication Data
US 2020/0150302 A1  May 14, 2020

(51) Int. Cl.
*G01V 1/30* (2006.01)
*G01V 1/32* (2006.01)
*G01V 1/34* (2006.01)

(52) U.S. Cl.
CPC ............ *G01V 1/303* (2013.01); *G01V 1/307* (2013.01); *G01V 1/325* (2013.01); *G01V 1/345* (2013.01)

(58) Field of Classification Search
CPC ........ G01V 1/303; G01V 1/307; G01V 1/325; G01V 1/345; G01V 2210/614; G01V 1/38;
(Continued)

(56) References Cited

U.S. PATENT DOCUMENTS 8,923,094 B2 * 12/2014 Jing ................. G01V 1/288
367/73
9,121,965 B2 * 9/2015 Al-Jadani ............... G01V 1/28
(Continued)

FOREIGN PATENT DOCUMENTS

GB         2492913 A       1/2013
GB         201818594    * 12/2018  ............ G01V 1/345
(Continued)

OTHER PUBLICATIONS

International Search Report and Written Opinion dated Feb. 3, 2020, for PCT/GB2019/053161, filed on Nov. 3, 2019.
(Continued)

*Primary Examiner* — Daniel Pihulic
(74) *Attorney, Agent, or Firm* — Conley Rose, P.C.

(57) ABSTRACT

A virtual seismic shot record is generated based at least in part on seismic interferometry of the passive seismic data. Then, a frequency bandwidth of the virtual seismic shot record is determined, wherein the frequency bandwidth comprises a plurality of frequencies. The virtual seismic shot record is transformed into a frequency-dependent seismic shot record based on a first frequency of the plurality of frequencies. Further, a phase shift is applied to the frequency-dependent seismic shot record. A first velocity model is generated from the phase shifted frequency-dependent seismic shot record. A second velocity model may be generated using full-waveform inversion (FWI). One or more depth slices are identified from the second velocity model. A seismic image is generated based on the one or more depth slices for use with seismic exploration above a region of subsurface including a hydrocarbon reservoir and containing structural features conducive to a presence, migration, or accumulation of hydrocarbons.

20 Claims, 5 Drawing Sheets

(58) Field of Classification Search
CPC ......... G01V 2210/123; G01V 2210/43; G01V 2210/612; G01V 1/301
See application file for complete search history.

(56) References Cited

U.S. PATENT DOCUMENTS

| | | | |
|---|---|---|---|
| 9,500,758 B2* | 11/2016 | Duret | G01V 1/36 |
| 10,338,270 B2* | 7/2019 | Cekorich | E21B 47/095 |
| 2011/0255371 A1* | 10/2011 | Jing | G01V 1/28 367/73 |
| 2014/0254319 A1* | 9/2014 | Al-Jadani | G01V 1/364 367/38 |
| 2015/0308864 A1* | 10/2015 | Paulsson | G01H 9/004 73/152.16 |
| 2016/0170053 A1* | 6/2016 | Duret | G01V 1/36 367/63 |
| 2016/0209537 A1 | 7/2016 | Chimiel et al. | |
| 2017/0131431 A1* | 5/2017 | Cekorich | G01H 9/006 |
| 2020/0150302 A1* | 5/2020 | Song | G01V 1/325 |

FOREIGN PATENT DOCUMENTS

| | | | |
|---|---|---|---|
| WO | 2008/001334 A2 | 1/2008 | |
| WO | 2010/0803661 A1 | 7/2010 | |
| WO | WO-2020099838 A1 * | 5/2020 | ............. G01V 1/303 |

OTHER PUBLICATIONS

M. Schimmel et al: Frequency-dependent phase coherence for noise suppression in seismic array data; Journal of Geophysical Research, vol. 112, No. B4, Jan. 1, 2007, XP055186960.

Pascal Edme et al: Receiver function method in reflection seismology, Geophysical Prospecting, vol. 56, No. 3, May 1, 2008, pp. 327-340, XP055661707.

Q. Liu et al: Seismic imaging: From classical to adjoint tomography, Tectonophysics., vol. 566-567, Sep. 1, 2012, pp. 31-66, XP055254424.

Zhenyue Liu: An analytical approach to migration velocity analysis, Geophysics, vol. 62, No. 4, Jul. 1, 1997, 3 pages 1238-1249, XP055225797.

British Search Report dated May 13, 2019 for GB Application No. 1818594.2 (3 pages).

* cited by examiner

PASSIVE SEISMIC IMAGING

CROSS-REFERENCE TO RELATED APPLICATIONS

This application claims benefit of UK patent application Serial No. 1818594.2 filed Nov. 14, 2018, and entitled "Passive Seismic Imaging," which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to analyzing passive seismic data, and more specifically, to the generation of a velocity model for imaging of hydrocarbons present in a seismic surveyed region based at least in part on passive seismic data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey typically includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits (e.g., a region within a subsurface region that contains hydrocarbons). Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Over time, as hydrocarbons are being extracted from the subsurface region of the Earth, the location, saturation, and other characteristics of the hydrocarbon reservoir (e.g., overburden) within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and receivers may be useful in the generation of, for example, seismic images. Seismic images may be used, for example, in the determination of hydrocarbon deposits (e.g., areas within a subsurface that contain hydrocarbons) and/or subsurface drilling hazards. Seismic images are generally produced based on seismic waveforms produced by the source that reflect off regions within a subsurface and are received by receivers. The seismic image may be constructed using a high resolution seismic velocity model, such as a full waveform inversion (FWI) model, a tomography model or the like applied, for example, via a velocity model builder. The seismic velocity model includes data that is indicative of a change in velocity of the seismic waveforms as they propagate through the subsurface region. The source that produces the seismic waveforms may be referred to as active sources (e.g., or anthropogenic sources of seismic waves such as explosives or air guns), or passive sources (e.g., non-anthropogenic sources such as waves or wind). Certain techniques employ active sources due to the resulting high signal-to-noise ratio (SNR) of the seismic waveforms. Passive sources may be used to complement active source seismic surveys. For example, passive sources may be utilized in the generation of velocity models of the near surface (e.g., less than approximately 500 m below the surface of the Earth and/or a seafloor).

In addition to the examples provided above, image or data registration techniques as described herein may be used for various applications in seismic data processing. For example, the systems and methods described below may be used for matching modeled and observed data during waveform inversion (FWI) for the purposes of building velocity models, matching seismic data pre- or post-migration during the process of iterative de-migration or re-migration sequences, matching predicted and recorded multiples (and/or other types of predicted noise) during the process of multiple suppression & removal for enhancing the signal-to-noise ratio, signal tracking across various images and/or aligning signals for imaging focusing for the purposes of improving the image quality, misalignment picking for tomography or velocity inversion, measuring and tracking a rate of change in seismic movies, and the like.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
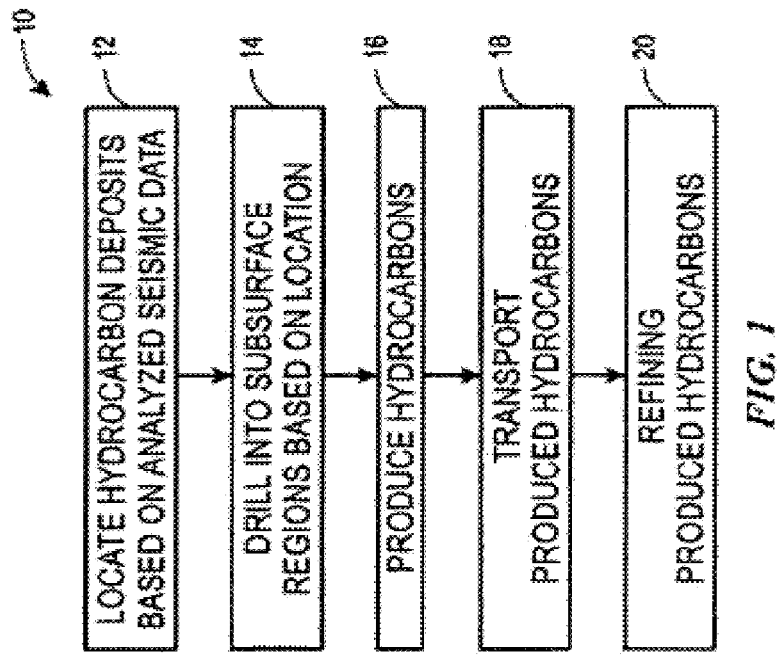
FIG. 1 illustrates a flow chart of various processes that may be performed based on analysis of seismic data acquired via a seismic survey system, in accordance with one or more embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Seismic data may provide valuable information with regard to the description (such as the location and/or change) of hydrocarbon deposits within a subsurface region of the Earth. Additionally, processing of the seismic data may be accomplished utilizing different techniques that may be selected based on, for example, the formation attributes and/or differing depths of the formation to be analyzed and/or imaged. Accordingly, in one embodiment, a higher resolution image (e.g., a higher quality image) for particular portions of a formation may be generated through selecting a particular type of processing (i.e., modification of seismic data processing techniques selected based on formation attributes and/or depths of a formation to achieve a higher resolution image of a particular portion of a formation).

As discussed herein, seismic data may be generated using active or passive seismic sources. Certain seismic imaging techniques use active seismic sources (e.g., air guns, explosives) as the resulting waveforms typically have high signal to noise ratios (SNR), as compared to waveforms resulting from passive seismic sources (e.g., wind, waves, and other non-anthropogenic sources). Passive seismic sources typically produce relatively low frequency seismic waves (e.g., less than or approximately 1 Hz to approximately 0.1 Hz), while active sources generally produce higher frequencies (greater than 1 Hz). Due to certain survey geometries, certain data processing techniques, and the higher frequency of sound waves produced by certain active sources, it may be difficult to image a near surface layer (e.g., approximately to a depth of 500 m) of a formation by using active seismic imaging. Further, certain active seismic imaging procedures are expensive as implementing the active source may require significant allocation of resources. In contrast, implementing passive seismic imaging is relatively inexpensive as the passive sources are "free", in that directed active transmission of waveforms by a user for data acquisition need not occur. Thus, techniques that improve the processing of passive seismic sources (e.g., through improving the SNR) are an improvement to the field of seismic imaging.

The present disclosure is generally directed to using passively acquired seismic data (e.g., passive seismic data) to derive surface wave velocity models (e.g., from surface waves), and, in some embodiments, generating images of a subsurface region to use for oil and gas production. It should be appreciated by one of ordinary skill in the art that the present techniques of one or more embodiments of the present invention are advantageous over certain methods, such as straight- or curved-ray travel-time tomography, as the present techniques may allow for the incorporation of curved rays automatically by performing finite-difference modeling. Furthermore, with the present techniques, travel time picking may be avoided, which results in a more stable inversion technique than the other aforementioned techniques. Specifically, with one or more embodiments of the present invention, the need for an operator to manually pick arrival times is avoided. As such, one or more embodiments can reduce possible human error and thus arrive at a more stable inversion. As used herein, "time picking" refers to identifying an arrival time (e.g., a time pick) of a seismic event recorded at a sensor or receiver. A time pick may include a phase part that is indicative of the phase of the wave of seismic energy as it arrived at the sensor or receiver.

In general, the methods of one or more embodiments include computing virtual seismic shot records from passive seismic data by seismic interferometry via cross-correlation of the passive seismic data over a time window. Then, a frequency bandwidth corresponding to the virtual seismic shot records can be determined. Further, for at least a portion of the frequencies in the frequency bandwidth, a velocity model may be computed, from which a depth slice of a formation may be extracted. In some embodiments, an image may be generated using all of the depth slices. In some embodiments, the image generated using the passive seismic data may be used to supplement active seismic data. For example, the image generated with the passive seismic data may be combined with the active seismic data to generate a combined image. In one embodiment, the passive seismic data may be used to represent a first depth portion (e.g., to a depth 500 m) of the combined image, while the active seismic data may be used to represent a second depth portion (e.g., distances below 500 m) of the combined image. In another embodiment, the passive seismic data may be further refined (e.g., to achieve an improved SNR based on additional data points) using the active seismic data.

By way of introduction, seismic data may be acquired using a variety of seismic survey systems and techniques. Regardless of the seismic data gathering technique utilized, after the seismic data is acquired, a computing system may analyze the acquired seismic data and may use the results of the seismic data analysis to perform various operations within the hydrocarbon exploration and production industries. The results of the seismic data analysis can be, for example, a map of geological formations. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

Figure 2:
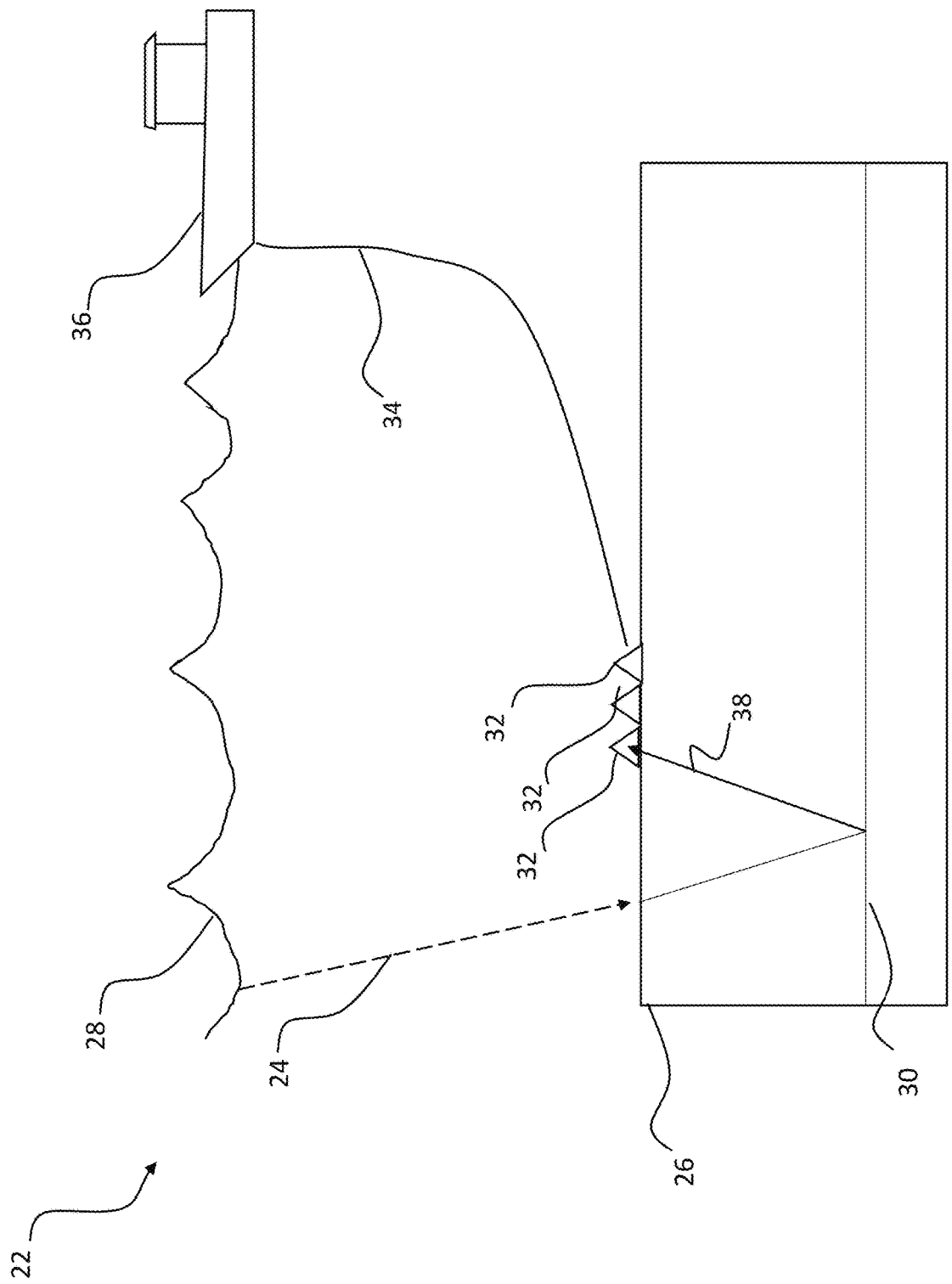
FIG. 2 illustrates a marine survey system in a marine environment, in accordance with one or more embodiments presented herein.

One technique for acquiring seismic data is shown in FIG. 2, which illustrates an Ocean Bottom Seismic (OBS) system 22 as a marine survey system (e.g., for use in conjunction with block 12 of FIG. 1) that also may be employed to acquire seismic data (e.g., waveforms) regarding a subsurface region of the Earth in a marine environment. The OBS system 22 may operate to generate seismic data (e.g., OBS datasets).

As illustrated, the OBS system 22 may receive a seismic source 24 which may produce energy, such as sound waves (e.g., seismic waveforms), that is directed at the seafloor 26. As illustrated, the seismic source 24 is passively occurring (e.g., as originating from a wave 28). It should be appreciated by one of ordinary skill in the art that seismic sources 24 may originate from wind, movement of ships, tectonic movements, or other non-anthropogenic sources. The energy originating from the seismic source may be reflected off of various geological formations 30 within the subsurface region 26 to generate a reflected seismic wave 38 and subsequently acquired (e.g., received and/or recorded) by the one or more receivers 32 disposed on the seafloor 26. For example, data may be stored in the one or more receivers 32 for an extended period of time (e.g., hours, days, weeks, or longer) prior to the stored data being retrieved (either via coupling with or wirelessly). Data acquired via the one or more receivers 32 may be transmitted via the cable 34 to the vessel 36 (or, for example, the acquired data can be wirelessly transmitted if the OBS system 22 is an ocean bottom node (OBN) system). In some embodiments, the vessel 36 may not be connected to the receivers 32 (e.g., via the cable 34), but may include suitable means for retrieving the one or more receivers 32 (e.g., a reel, a hook, a buoy). It should be appreciated that any other suitable means for retrieving the one or more receivers may be used. For example, the receivers 32 may be coupled to a buoy with a mechanism for drawing up the receivers 32.

In some embodiments, the seismic data may be acquired with a land survey system (e.g., in a non-marine environment) that may be disposed on a surface of a subsurface region of interest. For example, the land survey system may include land-based receivers that receive land-based seismic sources (e.g., land-based passive seismic sources such as rainfall, tectonic movements, earthquakes, and other non-anthropogenic sources). That is, the land-based seismic sources may produce energy that is directed at the subsurface region of the Earth. Upon reaching various geological formations (e.g., salt domes, faults, folds) within the subsurface region, the energy output by the land-based seismic sources may be reflected off of the geological formations and acquired by the land-based receives. In some embodiments, the land-based receivers may be dispersed across a surface of the earth to form a grid-like pattern. In some cases, one seismic waveform produced by the land-based seismic sources may be reflected off of different geological formations and received by different receivers. As such, each land-based receiver may receive a reflected seismic wave in response to passively occurring seismic sources on land.

Figure 3:
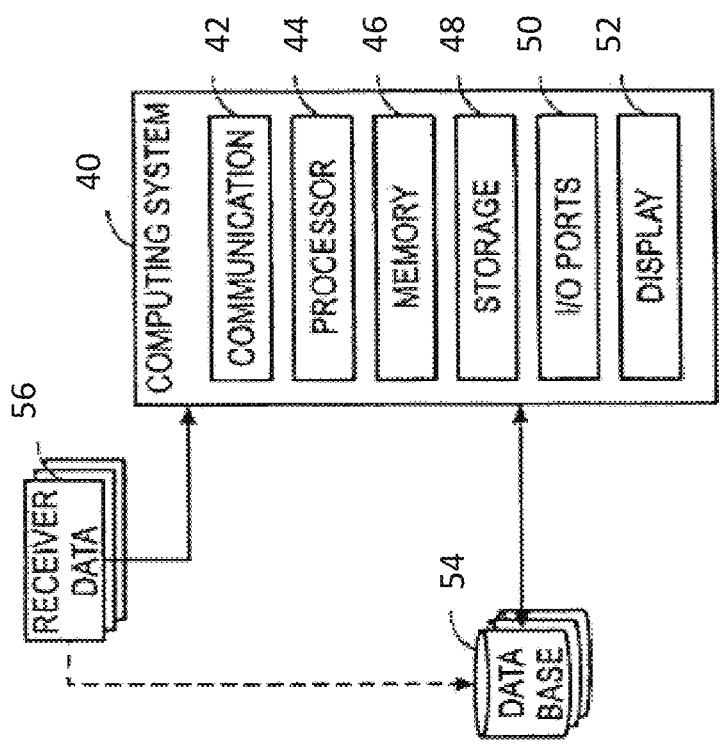
FIG. 3 illustrates a computing system that may perform operations described herein based on acquired seismic data, in accordance with one or more embodiments presented herein.

Regardless of how the seismic data is acquired (e.g., via the OBS system 22 or via a land survey system), a computing system (e.g., for use in conjunction with block 12 of FIG. 1) may analyze the seismic waveforms acquired by the receivers 32 to determine information regarding the geological structure, the location and property of hydrocarbon deposits, and the like within the subsurface region 26. Further, the computing system may provide an indication of the location of the hydrocarbon deposits as discussed herein. FIG. 3 illustrates an example of such a computing system 40 that may perform various data analysis operations to analyze the seismic data acquired by the receivers 32 to determine the structure of the geological formations within the subsurface region 26.

Referring now to FIG. 3, the computing system 40 may include a communication component 42, a processor 44, a memory 46, a storage 48, input/output (I/O) ports 50, a display 52, and the like. The communication component 42 may be a wireless or wired communication component that may facilitate communication between the receivers 32, one or more databases 54, other computing devices, and/or other communication capable devices. In one embodiment, the computing system 40 may receive receiver data 56 (e.g., seismic data, seismograms) that may have been previously acquired by seismic receivers via a network component, the database 54, or the like. The processor 44 of the computing system 40 may analyze or process the receiver data 56 to ascertain various features regarding geological formations within the subsurface region 26 of the Earth.

The processor 44 may be any type of computer processor or microprocessor capable of executing computer-executable code. The processor 44 may also include multiple processors that may perform the operations described below. The memory 46 and the storage 48 may be any suitable articles of manufacture that can serve as media to store processor-executable code, data, or the like. These articles of manufacture may represent computer-readable media (e.g., any suitable form of memory or storage) that may store the processor-executable code used by the processor 44 to perform the presently disclosed techniques. Generally, the processor 44 may execute software applications that include programs that process seismic data acquired via receivers of a seismic survey according to the embodiments described herein.

The memory 46 and the storage 48 may also be used to store the data, analysis of the data, the software applications, and the like. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may be interfaces that may couple to other peripheral components such as input devices (e.g., keyboard, mouse), sensors, input/output (I/O) modules, and the like. I/O ports 50 may enable the computing system 40 to communicate with the other devices in the OBS system 22, or the like via the I/O ports 50.

The display 52 may depict visualizations associated with software or executable code being processed by the processor 44. In one embodiment, the display 52 may be a touch display capable of receiving inputs from a user of the computing system 40. The display 52 may also be used to view and analyze results of the analysis of the acquired seismic data to determine the geological formations within the subsurface region 26, the location and property of hydrocarbon deposits within the subsurface region 26, and the like. The display 52 may be any suitable type of display, such as a liquid crystal display (LCD), plasma display, or an organic light emitting diode (OLED) display, for example. In addition to depicting the visualization described herein via the display 52, it should be noted that the computing system 40 may also depict the visualization via other tangible elements, such as paper (e.g., via printing) and the like.

With the foregoing in mind, the present techniques described herein may also be performed using a supercomputer that employs multiple computing systems 40, a cloud-computing system, or the like to distribute processes to be performed across multiple computing systems. In this case, each computing system 40 operating as part of a super computer may not include each component listed as part of the computing system 40. For example, each computing system 40 may not include the display component 52 since multiple display components 52 may not be useful to for a supercomputer designed to continuously process seismic data.

After performing various types of seismic data processing, the computing system 40 may store the results of the analysis in one or more databases 54. The databases 54 may be communicatively coupled to a network that may transmit and receive data to and from the computing system 40 via the communication component 42. In addition, the databases 54 may store information regarding the subsurface region 26, such as previous seismograms, geological sample data, seismic images, and the like regarding the subsurface region 26.

Although the components described above have been discussed with regard to the computing system 40, it should be noted that similar components may make up the computing system 40. Moreover, the computing system 40 may also be part of the OBS system 22, and thus may monitor and control certain operations of the receivers 32, and the like. Further, it should be noted that the listed components are provided as example components and the embodiments described herein are not to be limited to the components described with reference to FIG. 3.

In some embodiments, the computing system 40 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 40 may compare the two images to identify changes in the subsurface region 26. It is presently recognized that continuously or periodically producing a seismic image of a subsurface region 26 may improve detection of hydrocarbon deposits and/or subsurface hazards. In some embodiments, an indication of the deposit and/or subsurface hazard may be provided to an operator based on a determined change in two images. Further, in some embodiments, the change may indicated when the change between two or more images is greater than a threshold (e.g., a magnitude of change between pixels in first image and a second image exceeds a predetermined threshold). In other embodiments, the indication may be provided based on whether or not any change occurred.

In any case, a seismic survey may be composed of a very large number of individual seismic recordings or traces. As such, the computing system 40 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 40 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

As discussed above, the computing system 40 may be employed to analyze the acquired seismic data based on the reflected seismic waveforms 38 to obtain an image representative of the subsurface region 26 and to determine locations and properties of hydrocarbon deposits.

Figure 4:
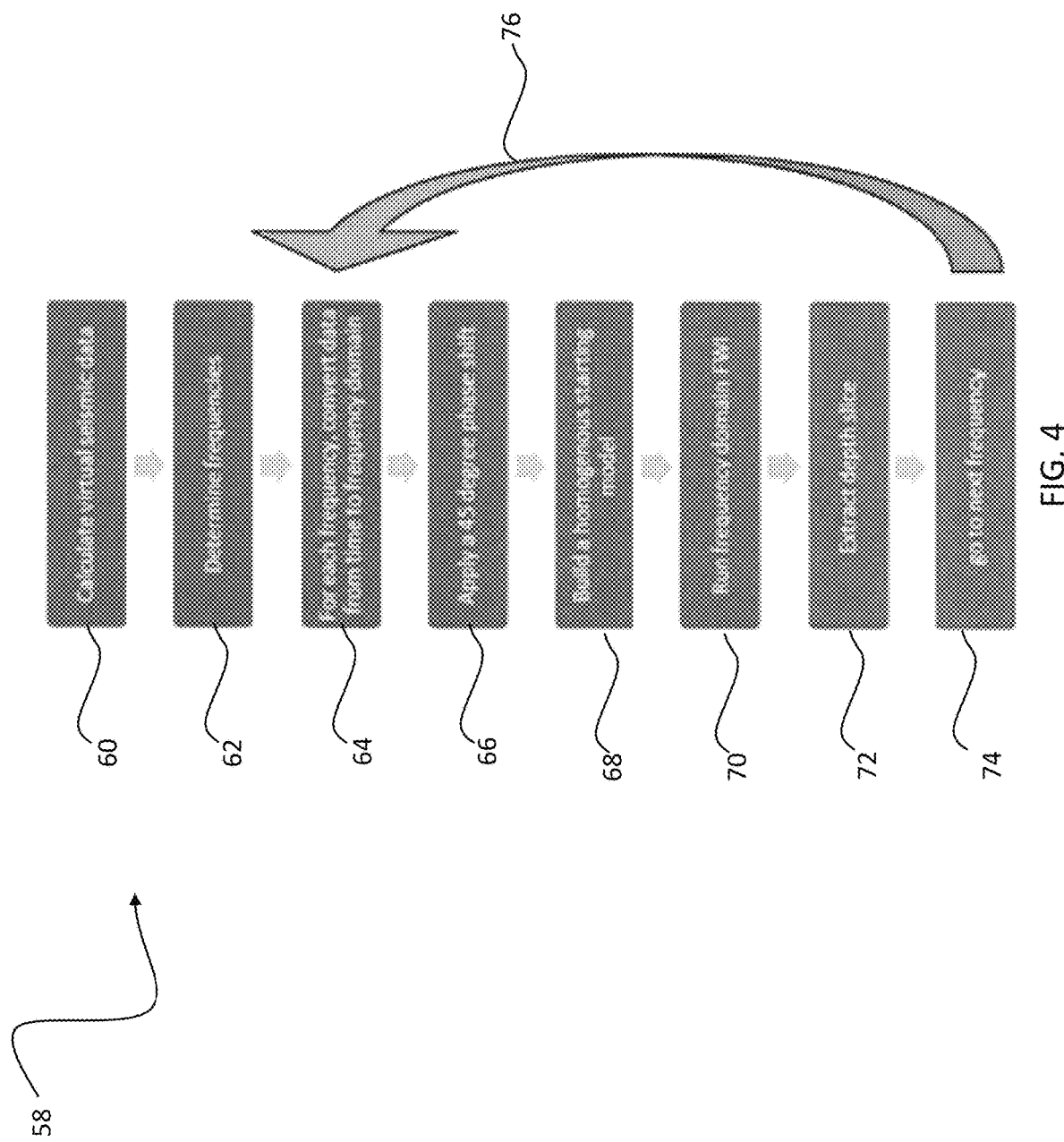
FIG. 4 illustrates a flow diagram for generating a velocity map based on passively acquired seismic data, in accordance with one or more embodiments presented herein.

In some embodiments, an image may be generated in conjunction with a seismic processing scheme such as, for example, the method 58 illustrated in FIG. 4. As illustrated, method 58 includes a seismic processing sequence that includes generating a virtual seismic shot record by seismic interferometry via cross-correlation of passive seismic data over a time window (block 60). In some embodiments, the time window may vary from several hours to several days. The virtual seismic data contains mainly surface waves.

Then, the frequency bandwidth of the virtual seismic shot records is analyzed to determine the minimum and maximum frequency and frequency interval for subsequent calculations (block 62). Due to surface wave dispersion, each frequency component of the frequency bandwidth of the virtual seismic shot records may be processed separately. As lower frequencies can travel to deeper parts of the subsurface, and as higher frequencies get progressively attenuated with depth, the velocity model for each frequency may be related to a particular depth. As such, a depth slice indicative of the composition of a portion of subsurface region may be generated for each frequency. In certain FWI methods, a velocity model is built based on the multiple frequencies determined from shot records. One embodiment of the present disclosure relates to using a single frequency to generate a velocity model, wherein the velocity model associated with the single frequency represents a depth slice.

Once the minimum and maximum frequency interval is determined, each frequency is transformed from the time-domain to the frequency-domain (block 64). This may be accomplished by a performing a discrete Fourier transform or by converting time picks to the phase part of frequency domain data. Such time picks can be obtained from an existing phase velocity travel time picking code. The subsequent steps (e.g., block 66, block 68, block 70, and block 72) are each carried out for each frequency within the frequency interval.

Continuing with method 58, a phase shift is applied to the phase of the frequency-domain data (block 66). In some embodiments, the phase shift may be a 45 degree phase shift, which may compensate for the 2D effect of the surface wave propagation. Then, a starting velocity model for full-waveform inversion (FWI) is generated based on the phase-shifted frequency domain virtual shot records (block 68). In one or more embodiments, a constant velocity may be chosen based on the approximate move-out (of the virtual seismic short records). As used herein, "move-out" refers to e.g., an effect (e.g., in some instances the effect is a hyperbolic relation) that a distance between a seismic source and a receiver has on the arrival time of a reflection (e.g., seismic wave 38) in the form of an increase of time with offset. In some embodiments, the constant velocity may be determined based on the mean value of a previously-run phase velocity tomography (e.g., if available for the current frequency in the current iteration).

Next, frequency-domain FWI is run for at least one iteration to generate a second velocity model (block 70). The convergence to a solution may slow down after several iterations. As such, a suitable predetermined convergence threshold may be implemented during the inversion in block 70 based on the convergence threshold, which would ensure that the velocity model is suitable for subsequent steps.

As noted above, each velocity map that is built based on a single frequency may correspond to a single depth within the subsurface region 26. As such, by extracting a depth slice from the computed velocity model, a surface wave velocity may be generated for the inverted frequency (block 72). Then, the method 58 may be repeated using a subsequent frequency (block 74) determined from block 62, which results in an additional depth slice based on a second frequency. As indicated by the arrow 76, the method 58 then proceeds with block 64 until FWI has been computed for all or a suitable number of frequencies. Then an image generated by combining at least a portion of the depth slices generated, via building a velocity map, from each frequency.

In some embodiments, it may be advantageous to repeat the method 58 for the same location with different time intervals (e.g., months, one year, two or more years) to obtain a 4D image. The 4D image may depict a change or no-change of a subsurface over the time intervals and, thus, may enable operators or analysts to make informed decisions regarding hydrocarbon deposits (e.g., where to drill) and/or potential subsurface hazards.

Figure 5:
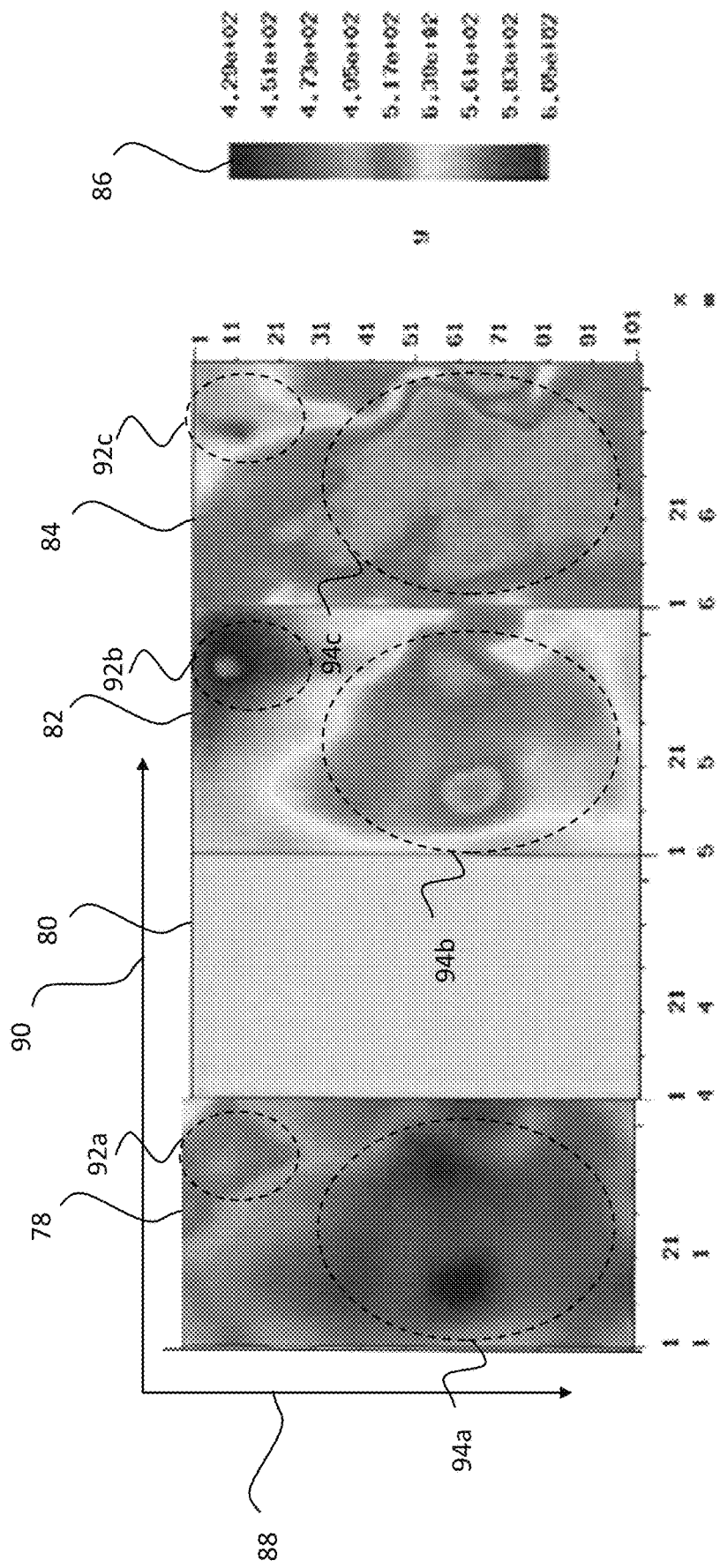
FIG. 5 illustrates an example of a seismic images generated by the computing system of FIG. 3, in accordance with one or more embodiments presented herein.

FIG. 5 shows multiple images 78, 80, 82, and 84 that were either generated based on velocity models applied to synthetic data using the presently disclosed techniques or are in different time points along the method 58. Specifically, image 78 corresponds to an image generated using a conventional approach. Images 80 and 82 correspond to an initial image and a final image, respectively, as generated by one or more embodiments of the present invention. Image 84 corresponds to a ground-truth image. The magnitude of the velocity is denoted with the scale 86. Axis 88 and axis 90 illustrate the x-y directions of a Cartesian plane for each image 78, 80, 82, and 84. Image 78 shows an image generated using ray-based tomography on a synthetic data set. Image 80 shows a starting model for FWI, which was used to generate image 82. Image 82 was generated based on the synthetic data in accordance with the present techniques. More specifically, image 82 was generated after 8 iterations on data from passive seismic sources. Image 84 shows the true velocity model from the synthetic data.

As noted above, each of the images 78, 82, and 84 were generated using different techniques. It should be appreciated by one of ordinary skill in the art that image 78, which was generated with ray-based tomography, is a relatively expensive procedure because it requires a lot of computation time to develop the velocity model. It is presently recognized that generating an image, such as 82, in accordance with the present techniques may be less expensive than the cost for generating image 78. That is, the present techniques related to generating images and/or velocity models are less expensive than ray-based tomography techniques, for example, and FWI on active seismic data. In particular, as previously described, image 82 can be generated using passive seismic waves, where producing image 82 is less expensive than producing images using active seismic waves. Passive seismic waves are "free," as they occur independent of any directed user action. Moreover, even though image 82 is less expensive to acquire, it may provide a closer representation relative to the true model, shown in image 84 and, thus, may be more accurate than certain alternative techniques.

The images 78, 82, and 84 include regions 92 and 94. In each of these regions, the pixel value according to the scale 86 is within a threshold or a threshold range that is indicative of an area of interest (e.g., hydrocarbon deposit within a region). More specifically, the determined velocity from the FWI, which was used to generate the image 82 shows that the region 92 and/or 94 might have characteristics (e.g., velocity of the seismic waves) that is indicative of geological anomalies and/or a presence of hydrocarbons.

In some embodiments, the computing system 40 may provide an indication of the regions $92a$, $92b$, and $92c$ and/or $94a$, $94b$, and $94c$. For example, the computing system 40 may determine a subset of the image 82 that includes pixels having values indicative of the presence of hydrocarbons that are above or below the threshold or within the threshold range. As such, the computing system 40 may provide an indication of the region, or subset of the region, of the subsurface 26 that is likely to have hydrocarbons and provide a position (e.g., coordinates or a relative area), or position data, of the regions, such as 92 and/or 94, that contain the hydrocarbon deposits and/or (in some cases) subsurface drilling hazards. It should be appreciated by one of ordinary skill in the art that the threshold may be predetermined or decided by an operator or analyst of an image (e.g., 78, 82, and/or 84) based on previous knowledge of the subsurface. In other embodiments, the image generated in accordance with the present techniques (e.g., image 82) may be displayed via the display 52 of the computing system 40, thus facilitating locating a region $92a$, $92b$, and $92c$ and/or $94a$, $94b$, and $94c$ by a user of the computing system 40.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 88 (f). However, for any claims containing elements designated in any other manner, it is intended that such elements are not to be interpreted under 35 U.S.C. 88 (f).

What is claimed is:

1. A method, comprising:
generating a virtual seismic shot record based at least in part on seismic interferometry of passively acquired seismic data;
determining a frequency bandwidth of the virtual seismic shot record, wherein the frequency bandwidth comprises a plurality of frequencies;
transforming the virtual seismic shot record into a frequency-dependent seismic shot record based on a first frequency of the plurality of frequencies;
applying a phase shift to the frequency-dependent seismic shot record to generate a phase-shifted frequency dependent seismic shot record;
generating a first velocity model from the phase shifted frequency-dependent seismic shot record;
generating a second velocity model using full-waveform inversion (FWI) based on the first velocity model;
identifying a depth slice from the second velocity model; and
generating a seismic image based at least in party on the depth slice for use with seismic exploration above a region of subsurface comprising a hydrocarbon reservoir and containing structural features conducive to a presence, migration, or accumulation of hydrocarbons.

2. The method of claim 1, comprising using discrete Fourier transform to obtain the frequency-dependent seismic shot record.

3. The method of claim 1, comprising converting time picks to a phase part of the frequency domain data to obtain the frequency-dependent seismic shot record.

4. The method of claim 1, comprising selecting, as the first velocity model, a velocity value based on an approximate move-out of the virtual seismic shot record.

5. The method of claim 1, comprising selecting, as the first velocity model, a velocity value based on a mean value of a previously run phase velocity tomography model.

6. The method of claim 1, wherein the depth slice corresponds to a respective frequency of the plurality of frequencies.

7. The method of claim 1, comprising transforming the virtual seismic shot record into an additional frequency-dependent shot record based on a second frequency of the plurality of frequencies; and
identifying an additional depth slice based at least in part on the additional frequency-dependent shot record.

8. The method of claim 7, comprising generating a seismic image based on the depth slice and the additional depth slice for use with seismic exploration above a region of subsurface comprising a hydrocarbon reservoir and containing structural features conducive to a presence, migration, or accumulation of hydrocarbons.

9. The method of claim 8, comprising combining the seismic image with an additional seismic image generated based at least in part on active seismic data to generate a supplemental seismic image.

10. The method of claim 9, wherein a first depth portion of the supplemental seismic image is based on the seismic image, and a second depth portion of the supplemental seismic image is based on the additional seismic image.

11. One or more tangible, non-transitory, machine-readable media comprising instructions configured to cause a processor to:
generate a virtual seismic shot record based at least in part on seismic interferometry of passively acquired seismic data;
determine a frequency bandwidth of the virtual seismic shot record, wherein the frequency bandwidth comprises a plurality of frequencies;
transform the virtual seismic shot record into a frequency-dependent seismic shot record based on a first frequency of the plurality of frequencies;
apply a phase shift to the frequency-dependent seismic shot record to generate a phase-shifted frequency dependent seismic shot record;
generate a first velocity model from the phase shifted frequency-dependent seismic shot record;
generate a second velocity model using full-waveform inversion (FWI) based on the first velocity model;
identify one or more depth slices from the second velocity model; and
generate a seismic image based on the one or more depth slices for use with seismic exploration above a region of subsurface comprising a hydrocarbon reservoir and containing structural features conducive to a presence, migration, or accumulation of hydrocarbons.

12. The one or more machine-readable media of claim 11, wherein the processor is configured to:
generate an additional seismic image based on additional passive seismic data; and
provide an indication based on a comparison between the seismic image and the additional seismic image.

13. The one or more machine-readable of claim 12, wherein the indication comprises a position location of the hydrocarbons.

14. The one or more machine-readable of claim 12, wherein the indication comprises a position of a subsurface hazard.

15. The one or more machine-readable media of claim 12, comprising instructions configured to cause a processor to transmit the indication for display on a display.

16. The one or more machine-readable media of claim 12, comprising instructions configured to cause the processor to convert time picks obtained by a phase velocity travel-time picking code to the phase part of the frequency domain data to obtain the frequency-dependent seismic shot record.

17. The one or more machine-readable media of claim 12, wherein the first velocity model comprises a velocity value that is selected based on a mean value of a previously run phase velocity tomography model.

18. A device, comprising:
a processor configured to:
generate a virtual seismic shot record based at least in part on seismic interferometry of the passively acquired seismic data;
determine a frequency bandwidth of the virtual seismic shot record, wherein the frequency bandwidth comprises a plurality of frequencies;
transform the virtual seismic shot record into a frequency-dependent seismic shot record based on a first frequency of the plurality of frequencies;
apply a phase shift to the frequency-dependent seismic shot record to generate a phase-shifted frequency dependent seismic shot record;
generate a first velocity model from the phase shifted frequency-dependent seismic shot record;

generate a second velocity model using full-waveform inversion (FWI) based on the first velocity model;

identify one or more depth slices from the second velocity model; and generate a seismic image based on the one or more depth slices for use with seismic exploration above a region of subsurface comprising a hydrocarbon reservoir and containing structural features conducive to a presence, migration, or accumulation of hydrocarbons.

19. The device of claim 18, wherein the processor is configured to provide an indication of a position of hydrocarbon deposits.

20. The device of claim 18, wherein the processor is configured to:

generate an additional seismic image based on additional passive seismic data;

provide an indication of a change in a formation based on a comparison between the seismic image and the additional seismic image.

* * * * *